(12) United States Patent
Kwok et al.

(10) Patent No.: US 10,826,823 B2
(45) Date of Patent: Nov. 3, 2020

(54) CENTRALIZED LABEL-BASED SOFTWARE DEFINED NETWORK

(71) Applicant: Facebook, Inc., Menlo Park, CA (US)

(72) Inventors: Henry Kwok, Fremont, CA (US); Songqiao Su, Fremont, CA (US); Petr V. Lapukhov, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 25 days.

(21) Appl. No.: 16/050,875

(22) Filed: Jul. 31, 2018

(65) Prior Publication Data

US 2020/0044963 A1 Feb. 6, 2020

(51) Int. Cl.
*H04L 12/743* (2013.01)
*H04L 12/751* (2013.01)
*H04L 12/723* (2013.01)
*H04L 12/26* (2006.01)

(52) U.S. Cl.
CPC .......... *H04L 45/50* (2013.01); *H04L 43/0882* (2013.01)

(58) Field of Classification Search
CPC ... H04L 45/50; H04L 45/125; H04L 45/7453; H04L 45/24; H04L 43/0811; H04L 43/0882; H04L 45/02; H04L 12/1877; H04L 45/16
USPC ......................................................... 370/252
See application file for complete search history.

(56) References Cited

U.S. PATENT DOCUMENTS

| | | | | |
|---|---|---|---|---|
| 2013/0107712 A1* | 5/2013 | Allan | ...................... | H04L 45/24 370/235 |
| 2014/0071813 A1* | 3/2014 | Cheung | ................... | H04L 49/65 370/228 |
| 2014/0351397 A1* | 11/2014 | Pan | ........................ | H04L 45/125 709/223 |
| 2016/0021005 A1* | 1/2016 | Kiyose | ................ | H04L 45/7453 370/401 |
| 2016/0028625 A1* | 1/2016 | Hari | ........................ | H04L 45/74 370/392 |
| 2016/0277291 A1* | 9/2016 | Lakshmikanthan | .. | H04L 45/507 |
| 2017/0237656 A1* | 8/2017 | Gage | ........................ | H04L 45/74 370/392 |
| 2017/0346727 A1* | 11/2017 | Perrett | ................... | H04L 45/126 |
| 2018/0139130 A1* | 5/2018 | Crickett | ................ | H04L 41/145 |
| 2018/0212861 A1* | 7/2018 | Ou | ........................... | H04L 45/02 |
| 2018/0359181 A1* | 12/2018 | Rumyankov | ........... | H04L 45/66 |
| 2019/0245830 A1* | 8/2019 | Ratnasingham | .... | H04L 63/0272 |

* cited by examiner

*Primary Examiner* — Edan Orgad
*Assistant Examiner* — Vanneilian Lalchinthang
(74) *Attorney, Agent, or Firm* — Van Pelt, Yi & James LLP

(57) ABSTRACT

A specification of network paths between a group of computer network routers is received and possible route paths between routers of the group of computer network routers are determined. A unique identifier is assigned to each route path of the possible route paths. A preferred route path of network traffic between a source computer network router and a destination computer network router among the group of computer network routers is determined and the unique identifier assigned to the preferred route path is identified. A specification of the identified unique identifier and a specification of at least a portion of the preferred route path that corresponds to the identified unique identifier are provided to at least the computer network routers in the preferred route path.

20 Claims, 7 Drawing Sheets

CENTRALIZED LABEL-BASED SOFTWARE DEFINED NETWORK

BACKGROUND OF THE INVENTION

Data centers that host web applications are typically interconnected. Like many networks, the data centers face bandwidth requirements and congestion, particularly with the increase in popularity of photos and videos. In some situations, additional data centers may be brought online and new network nodes and links are added to the network connecting data centers together. To expedite the delivery of data, the routes between the data centers are monitored and typically the shortest path between source and destination nodes is selected. As the network topology grows, the path taken to reach certain destinations from a particular source location may begin to reach the limit of the network forwarding hardware. Moreover, at times, the shortest path does not correspond to the fastest path in terms of latency. One traditional approach is to create an explicit route that is specified in the packet headers to indicate a more optimal path. However, a hardware limit on the number of network hops that can be encoded in the packet header typically limits the applicability of this approach. Therefore, there exists a need for a solution that optimizes the route from a source to a destination as the number of hops between nodes reaches the limit of the network hardware.

BRIEF DESCRIPTION OF THE DRAWINGS

Various embodiments of the invention are disclosed in the following detailed description and the accompanying drawings.

DETAILED DESCRIPTION

Figure 1:
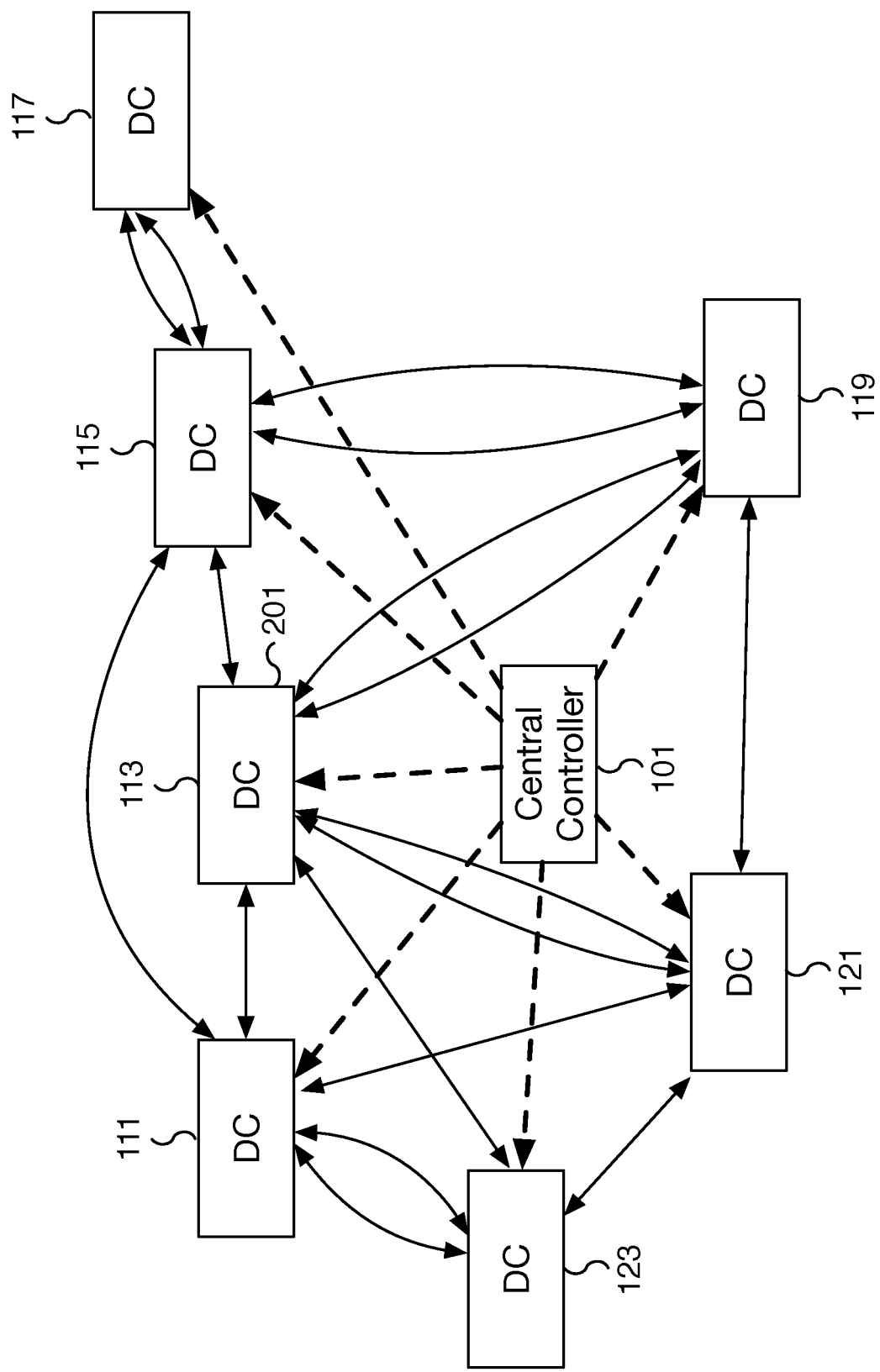
FIG. 1 is a block diagram illustrating an embodiment of a single label stack software defined network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A single label stack software defined network is disclosed. In various embodiments, a software defined network utilizes a label stack with a single label for forwarding packets from source to destination nodes. The software defined network includes a central controller that determines and defines possible paths through the network starting from a source, through intermediary hops, and arriving a destination. In some embodiments, the source, destination, and intermediary hops are computer network routers that may be associated with data centers. Once a route path is defined, the path is assigned a unique path identifier or label that is distributed, along with the route path information, to at least the relevant routers along the path. In various embodiments, the routers along the path use the unique path identifier, such as a path label, to route a packet from its source to its destination. For example, intermediary hops pop off the unique path label off the label stack, use it to determine the appropriate egress interface for the next hop, and then push the same path label back onto the stack before forwarding the packet to its next hop via the selected egress interface. In some embodiments, the operation is a label swap, where the path label is swapped with the same unique path label to forward the packet along the path defined by the unique path label. By swapping the unique path label with the same label, the disclosed software defined network avoids the need for multiple labels and the limitations of the network and network hardware associated with multiple labels. For example, as the network topology grows, the number of network hops to be encoded may begin to exceed the stack depth allowed by many forwarding routers. A single label stack routing approach reduces the dependency of the network diameter and the maximum number of hops on the stack depth limits. Moreover, by using a central controller, the routing decisions are made using a global network perspective allowing for more efficient routing decisions. Instead of a network router selecting the next hop based on knowledge limited to the local node, a central controller determines the entire route path based on the network status of the entire network. For example, a longer route may be selected that is faster and less congested than a shorter route. As another example, rather than routing around congestion using nodes close to congested links, the network may utilize a path that shares as few common links as possible with a congested path. Backup or alternative paths may be selected based on the difference between the two paths to better and more efficiently utilize available network resources. In various embodiments, a central controller is used to implement a centralized dynamic label scheme. By distributing labels dynamically and via a central controller, the disclosed software defined network provides better visibility, for example, for network monitoring and troubleshooting in the presence of faults. Moreover, the speed of programming the network is improved, for example, by not requiring updates to propagate through a sequence of routers. In some embodiments, multiple software defined networks may operate in parallel and each may have its own set of preferred route paths. For example, a data packet can take one of several different software defined networks to reach a destination, where the preferred route for each of the software defined networks uses a single label stack. Moreover, the different preferred route paths for each software defined network may be selected for diversity of paths.

In some embodiments, a specification of network paths between a group of computer network routers is received. For example, a network topology including different computer network routing nodes of the network is received by a central controller. The network topology includes the paths, such as network links, connecting the various routing nodes of the network. In some embodiments, the paths include the ingress and egress interfaces that connect one router to another. In various embodiments, the computer network routers correspond to data centers and the network paths describe the connectivity between the various data centers. In some embodiments, the possible route paths between routers of the group of computer network routers are determined and a unique identifier is assigned to each route path of the possible route paths. For example, for any given source and destination pair of routers along of the network, a route path is determined that includes the particular intermediary nodes used to forward a packet from the source computer network router to the destination computer network router. A unique identifier is assigned to the route path and can be used to define the path. In various embodiments, each router along the path receives the unique identifier and associates the appropriate egress interface with the next hop of the route path. In some embodiments, a preferred route path of network traffic between a source computer network router and a destination computer network router among the group of computer network routers is determined. For example, the traffic and congestion of the network is monitored and the route paths used are optimized to efficiently utilize network resources. Preferred route paths may be determined based on the monitored network traffic. As an example, an alternative route path may become the preferred route path in response to the previously preferred route path becoming congested. In some embodiments, the unique identifier assigned to the preferred route is identified. For example, once a preferred route path is determined, the unique identifier, such as a route path label, is identified for the preferred route. In some embodiments, the unique identifier is generated using a combination of the source and destination identifiers, such as site numbers associated with the source and destination nodes. In some embodiments, the unique identifier includes the traffic class of the route path, label switched path (LSP) information such as an LSP index, and a version number for the route path. In some embodiments, a specification of the identified unique identifier assigned to the preferred route path for the source computer network router and the destination computer network router and a specification of at least a portion of the route path that corresponds to the identified unique identifier is provided to at least the routers in the preferred route. For example, a central controller provides a specification of the identified unique identifier assigned to the preferred route path for a source and destination router pair to each of the routers along the preferred route path. In some embodiments, the unique identifier is a route path label and the specification is used by each of the router hops to identify the next hop along the preferred route path. For example, each router associates the unique identifier with the appropriate egress interface for forwarding the packet along the preferred route path. In some embodiments, only the routers along the path receive the specification of the identified unique identifier. In some embodiments, the specifications associated with identified unique identifiers are routinely updated based on the monitored status of the network.

FIG. 1 is a block diagram illustrating an embodiment of a single label stack software defined network. In the example shown, the single label stack software defined network includes central controller 101 and data centers 111, 113, 115, 117, 119, 121, and 123. In some embodiments, central controller 101 may be replicated to increase the reliability of the system. In some embodiments, the data centers are geographically dispersed and each include one or more computer network routers for routing data in and out of the data centers. In the example shown, central controller 101 is communicatively connected, represented by the dotted lines from control controller, to each of data centers 111, 113, 115, 117, 119, 121, and 123. For example, central controller 101 can issued remote procedure calls (RPCs) to each of the data centers 111, 113, 115, 117, 119, 121, and 123 for programming the routing in and out of the data centers. In various embodiments, the network connection between control controller 101 and each of data centers 111, 113, 115, 117, 119, 121, and 123 is a bi-directional connection.

In the example shown, data centers 111, 113, 115, 117, 119, 121, and 123 are communicatively connected. In some embodiments, the data centers are connected using high performance network connections that serve as high bandwidth data connections between the data centers. In some embodiments, the network connections between any pair of data centers 111, 113, 115, 117, 119, 121, and 123 utilize a unique identifier, such as a unique path label, for identifying the route path (direct or via one or more hops) between the pair. In various embodiments, the network connections between data centers utilize Multiprotocol Label Switching (MPLS) for forwarding packets between one another. In the example shown, network connections connecting the data centers are depicted by double-sided arrows. In some embodiments, the data centers are connected with multiple connections. For example, multiple connections may be utilized to increase the bandwidth and reliability of data communications between a pair of data centers. As an example, data center 111 is communicatively connected to data center 123 using two different network connections. Similarly, data center 113 is communicatively connected to each of data centers 119 and 121 using two different network connections. In the example shown, data center 111 is communicatively connected to data centers 113, 115, 121, and 123; data center 113 is communicatively connected to data centers 111, 115, 119, 121, and 123; data center 115 is communicatively connected to data centers 111, 113, 117, and 119; data center 117 is communicatively connected to data centers 115; data center 119 is communicatively connected to data centers 113, 115, and 121; data center 121 is communicatively connected to data centers 111, 113, 119, and 123; and data center 123 is communicatively connected to data centers 111, 113, and 121. Using the described network topology, each data center of FIG. 1 is communicatively connected to each of the other data centers either directly or via one or more intermediate data center hops.

In some embodiments, the data centers 111, 113, 115, 117, 119, 121, and 123 are each associated with computer network routers that are compatible with a single label stack. In various embodiments, a computer network router supporting Multiprotocol Label Switching (MPLS) is compatible with a single label stack. In various embodiments, a single label stack is a label stack where only a single label is used. For example, the hardware may support a label stack of up to four labels but only a single unique path label is used to define the entire route path from a source computer network router to a destination computer router.

Figure 2:
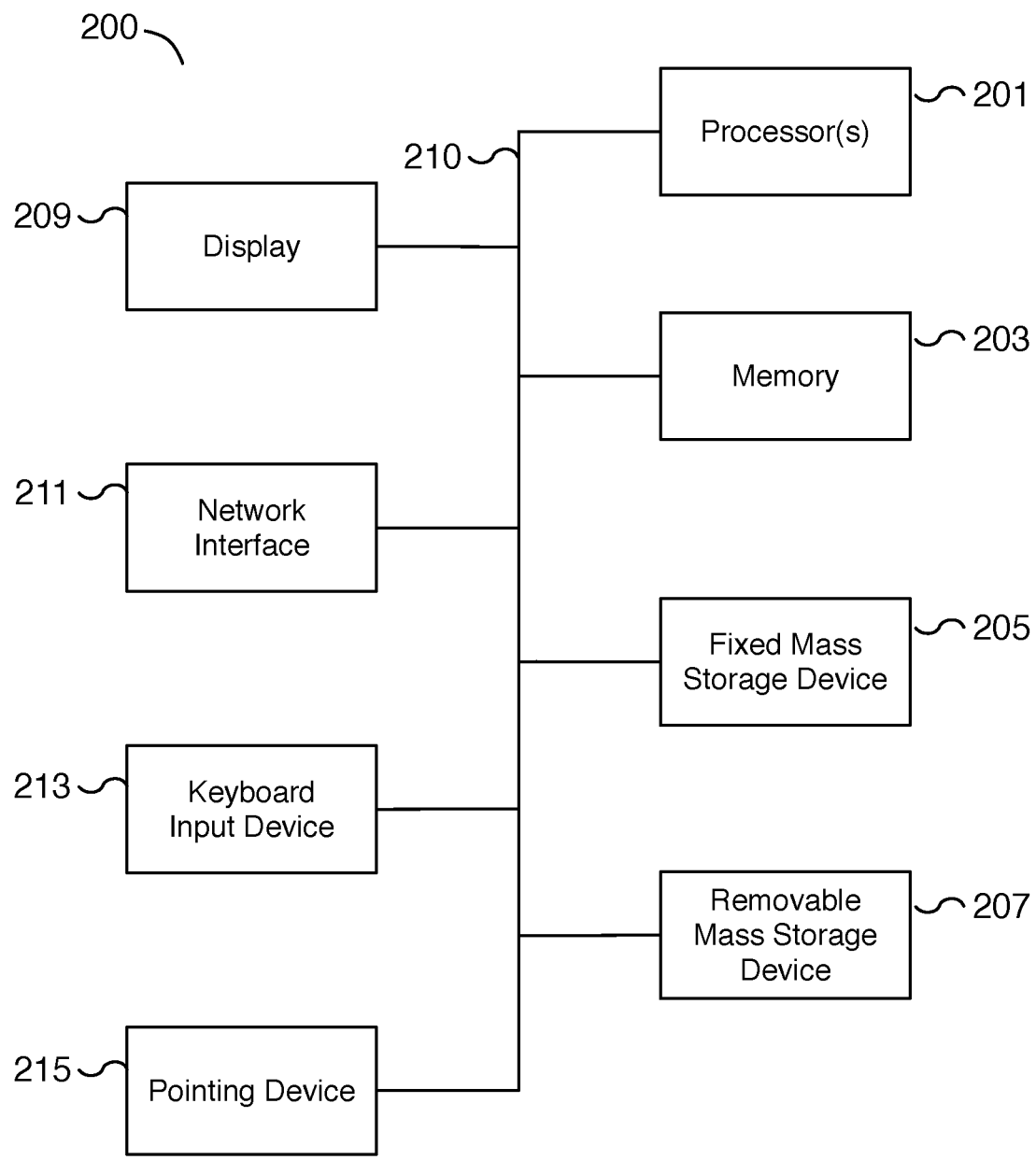
FIG. 2 is a functional diagram illustrating a programmed computer system for a single label stack software defined network.

FIG. 2 is a functional diagram illustrating a programmed computer system for a single label stack software defined network. As will be apparent, other computer system architectures and configurations can be used to monitor, manage, and/or control a single label stack software defined network. In some embodiments, computer system 200 is a virtualized computer system providing the functionality of a physical computer system. Computer system 200, which includes various subsystems as described below, includes at least one microprocessor subsystem (also referred to as a processor or a central processing unit (CPU)) 201. For example, processor 201 can be implemented by a single-chip processor or by multiple processors. In some embodiments, processor 201 is a general purpose digital processor that controls the operation of the computer system 200. Using instructions retrieved from memory 203, the processor 201 controls the reception and manipulation of input data, and the output and display of data on output devices (e.g., display 209). In some embodiments, processor 201 includes and/or is used to provide functionality for receiving a specification of network paths between a group of computer network routers; determining possible route paths between routers of the group of computer network routers and assigning a unique identifier to each route path of the possible route paths; determining a preferred route path of network traffic between a source computer network router and a destination computer network router among the group of computer network routers; identifying the unique identifier assigned to the preferred route path; and providing at least to routers in the preferred route path a specification of the identified unique identifier assigned to the preferred route path for the source computer network router and the destination computer network router and a specification of at least a portion of the route path that corresponds to the identified unique identifier. In some embodiments, computer system 200 is used to provide the functionality of central controller 101 and/or the computer network routers of data centers 111, 113, 115, 117, 119, 121, and 123 of FIG. 1. In some embodiments, processor 201 performs the processes described below with respect to FIGS. 3-5. In some embodiments, processor 201 performs the process described below with respect to FIG. 6.

Processor 201 is coupled bi-directionally with memory 203, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 201. Also as is well known in the art, primary storage typically includes basic operating instructions, program code, data, and objects used by the processor 201 to perform its functions (e.g., programmed instructions). For example, memory 203 can include any suitable computer-readable storage media, described below, depending on whether, for example, data access needs to be bi-directional or unidirectional. For example, processor 201 can also directly and very rapidly retrieve and store frequently needed data in a cache memory (not shown).

A removable mass storage device 207 provides additional data storage capacity for the computer system 200, and is coupled either bi-directionally (read/write) or uni-directionally (read only) to processor 201. For example, storage 207 can also include computer-readable media such as flash memory, portable mass storage devices, magnetic tape, PC-CARDS, holographic storage devices, and other storage devices. A fixed mass storage 205 can also, for example, provide additional data storage capacity. Common examples of mass storage 205 include flash memory, a hard disk drive, and an SSD drive. Mass storages 205, 207 generally store additional programming instructions, data, and the like that typically are not in active use by the processor 201. Mass storages 205, 207 may also be used to store user-generated content and digital media for use by computer system 200. It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can also be used to provide access to other subsystems and devices. As shown, these can include a display 209, a network interface 211, a keyboard input device 213, and pointing device 215, as well as an auxiliary input/output device interface, a sound card, speakers, additional pointing devices, and other subsystems as needed. For example, the pointing device 215 can be a mouse, stylus, track ball, or tablet, and is useful for interacting with a graphical user interface.

The network interface 211 allows processor 201 to be coupled to another computer, computer network, or telecommunications network using one or more network connections as shown. For example, through the network interface 211, the processor 201 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 211.

An auxiliary I/O device interface (not shown) can be used in conjunction with computer system 200. The auxiliary I/O device interface can include general and customized interfaces that allow the processor 201 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 210 is illustrative of any interconnection scheme serving to link the subsystems. Other computer architectures having different configurations of subsystems can also be utilized.

Figure 3:
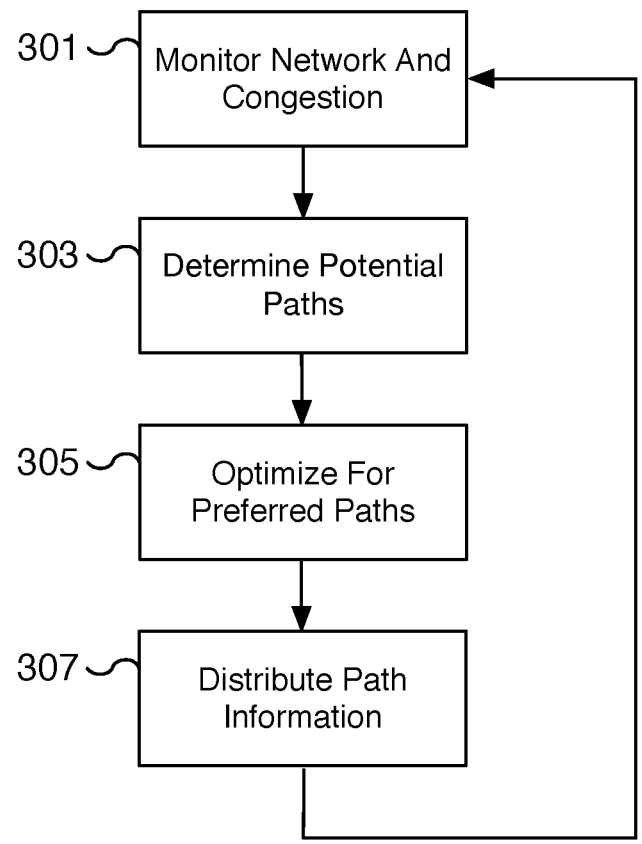
FIG. 3 is a flow diagram illustrating an embodiment of a process for managing a single label stack software defined network.

FIG. 3 is a flow diagram illustrating an embodiment of a process for managing a single label stack software defined network. In various embodiments, the process is performed by a central controller such as central controller 101 of FIG. 1. For example, a central controller monitors the status of the network, such as monitoring for congestion on the links between nodes of the network, and determines preferred routes for sending data packets between nodes. In various embodiments, the central controller acts as a central authority for determining the global routing paths taken when sending data from one node of the network to another. Rather than rely on multi-label switching or IP routing, a single label stack software defined network approach maintains much of the speed and efficiency of label switching without the same maximum hop limitations imposed by many hardware forwarding devices. In various embodiments, the process of FIG. 3 is performed on a network topology such as the single label stack software defined network of FIG. 1 where the different nodes of the network are data centers with associated computer network routers. In some embodiments, the process of FIG. 3 is performed by computer system 200 of FIG. 2.

At 301, a network and congestion of the network is monitored. In some embodiments, the monitoring including monitoring for network faults, such as downed links or network connections. In some embodiments, the congestion detected by monitoring is the result of increased traffic due to user network behaviors. For example, users may commonly utilize a web application hosted at data center nodes during certain hours of the day thereby increasing the network bandwidth demands during at those certain data centers or nodes. In various embodiments, the monitoring is performed and used to measure the efficiency of route paths through the network. Monitoring may be used to detected routes that are underutilized as well as route paths that are operating over the expected or ideal capacity. By monitoring the network and the congestion of the network, new route paths can be introduced to smooth out the network traffic, improve the performance for end users, and reduce the load on the network equipment. In various embodiments, the monitoring includes determining the current network topology and may include identifying active and inactive links, congested and uncongested links, new nodes and removed nodes, etc.

At 303, potential route paths are determined. For example, new route paths are determined based on the network topology. In various embodiments, a route path includes the source and destination node, as well as each hop from the source to the destination. In various embodiments, each determined potential path is a unique path (and may include intermediary hops) beginning at the source and arriving at the destination node. In some scenarios, a route path may be a direct link between two data centers or may require multiple hops using intermediary nodes between the source and destination data center. In various embodiments, the potential route paths are based on the network monitoring performed at 301 including the monitored topology of the network.

At 305, the network is optimized for preferred paths. In various embodiments, optimizing for the preferred paths results in selecting preferred route paths from the route paths determined at 303. In some embodiments, the selected preferred paths are based on the monitoring results of 301. For example, based on the monitoring performed at 301, the potential paths determined at 303 are used to determine one or more preferred route paths. As one example, a link is observed to be congested at 301 and therefore a preferred route path is selected from the paths determined at 303 that does not utilize the congested link. As another example, the preferred route path may be selected to optimize for the fewest hops, to optimize for shortest overall latency, to optimize for links with available bandwidth capacity, to avoid certain links and/or data centers based on scheduled downtimes, and/or to utilized underutilized bandwidth capacity, among other appropriate goals. In various embodiments, the route path with the shortest number of hops may not be the optimal route path and a preferred path is selected that is faster but includes more intermediary hops.

At 307, route path information is distributed. For example, the preferred route path information is distributed to routers along the route path. In some embodiments, the route path information is distributed using remote procedure calls. In some embodiments, the information is distributed to additional routers than the routers along the path. For example, in some embodiments, all nodes of the network receive the preferred route path information. In various embodiments, the route path information includes a unique single label and/or unique route path identifier that defines the route path from a source to a destination via any intermediary hops and specifies at least a portion of the route path that corresponds to the unique identifier. In some embodiments, the route path information is continuously updated and the route path information may include version information used to expire outdated paths.

In some embodiments, once route path information is distributed through the network, the processing may loop back to 301 and the process of FIG. 3 may be performed as a continuous cycle. For example, the network is continuously monitored at 301, paths are determined at 303, optimal paths are selected as preferred paths at 305, and the path information is distributed at 307 before the monitoring results are gathered again at 301. In some embodiments, the network is continuously monitored since the network traffic is dynamic and changes in real time. Network links may go down, links may become congested, links may no longer be congested, and new nodes and/or network links may be added, among other detected changes that may impact the network topology and efficiency of the preferred route paths. New preferred route paths are selected and the corresponding route path information is distributed and utilized for current and/or future traffic. In this manner, the process of FIG. 3 dynamically adjusts to traffic and network conditions to create a more efficient and reliable network. In some embodiments, the steps of FIG. 3 may be performed continuously and in parallel (not shown). For example, while path information is being distributed at 307, the network is being monitored at 301, potential paths are determined using the available monitored results at 303, and preferred paths are selected based on available routes and monitored results at 305.

Figure 4:
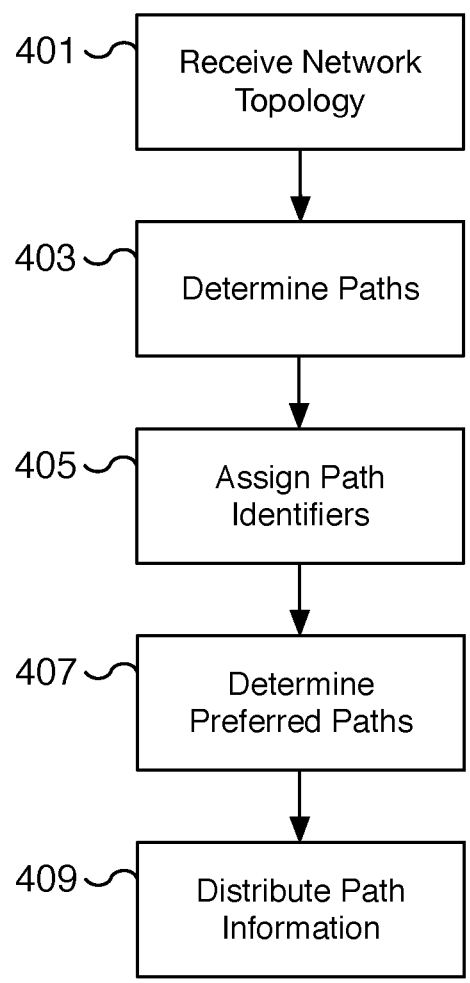
FIG. 4 is a flow diagram illustrating an embodiment of a process for managing a single label stack software defined network.

FIG. 4 is a flow diagram illustrating an embodiment of a process for managing a single label stack software defined network. In various embodiments, the process is performed by a central controller such as central controller 101 of FIG. 1. For example, a central controller determines, assigns, and distributes a path identifier and preferred route path information for determining the route path for transmitting data between source and destination nodes. In various embodiments, the process of FIG. 4 is performed on a network topology such as the single label stack software defined network of FIG. 1 where the different nodes of the network are data centers and their associated computer network routers. In some embodiments, the process of FIG. 4 is performed by computer system 200 of FIG. 2. In some embodiments, the step of 401 is performed at 301 of FIG. 3, the step of 403 is performed at 303 of FIG. 3, the step of 405 is performed at 303 and/or 305 of FIG. 3, the step of 407 is performed at 305 of FIG. 3, and/or the step of 409 is performed at 307 of FIG. 3.

At 401, the network topology is received. For example, the network topology including newly added nodes and/or links is received. In some embodiments, the network topology includes the operating status of nodes and/or links, such as the available resource capacity and/or supported network protocols of the node/link. In various embodiments, the received topology describes the different nodes. For example, the specification of network paths may include how the nodes are interconnected using network paths and unique addresses for identifying each of the nodes. In some embodiments, a new topology is received in response to a new node and/or link is added or removed.

At 403, route paths through the network are determined. For example, one or more available routes a data packet may travel through the network from a source node to a destination node are determined. In some embodiments, more than one route path will exist and a route path may be direct or include multiple intermediary hops. In various embodiments, some route paths from the same source to the same destination may differ. For example, one route may have higher or lower latency, have more or less overall bandwidth capacity, have more or fewer hops, be more or less congested, etc.

At 405, unique path identifiers are assigned to the determined route paths. Based on the determined path routes through the network, a unique path identifier is assigned to a unique path. In various embodiments, a path identifier uniquely defines the source, destination, any intermediate hops, and the order of the hops. In some embodiments, the path identifier is a number such as a 20-bit number. In some embodiments, the path identifier is a single path label identifier. For example, the unique path identifier may be a single path label that meets the requirements of Multiprotocol Label Switching (MPLS) hardware. In various embodiments, the path identifier is generated and includes meta-information regarding the route. For example, the path identifier may include an encoding of the source node, the destination node, traffic class, label switched path (LSP) information such as an LSP index, and/or version number. In some embodiments, intermediary hops are encoded in the path identifier. In some embodiments, the version number is generated based on the route path and subsequent versions of the route from the same source to the same destination share a common identifier. In various embodiments, multiple bits of the path identifier are reserved for a version number and/or the version number cycles between a fixed number of potential outstanding different versions. For example, two bits may be reserved for versioning allowing for four different versions of the same route from a particular source to a particular destination with potentially different intermediary hops. In various embodiments, the different nodes may be encoded using unique site numbers.

At 407, preferred route paths are determined. For example, based on monitored metrics of the network, one or more preferred route paths are determined. In some embodiments, the preferred route paths are the paths utilized for sending traffic over the network. Preferred route paths may be selected based on different metrics such as latency, bandwidth, congestion, link and/or node availability, etc. In some embodiments, a threshold value is used to determine whether to select one route as the preferred route path over another route. For example, in response the bandwidth demands exceeding a threshold value, such as 80% of the bandwidth capacity of a particular link, a new preferred route is selected to ease the bandwidth demands on the existing route. In some embodiments, one or more preferred routes are utilized for the same source and destination nodes. For example, two-thirds of the traffic may be directed to one preferred route and the remaining one-third is directed to a second preferred route. In some embodiments, a threshold value is utilized to prevent route switching from fluctuating too quickly. For example, the preferred route may be configured to only change back and forth between two routes a maximum number of times over a time period.

In some embodiments, each link and/or node of the network topology is assigned a score and an overall summary score is calculated to determine the preferred route path. For example, a score may be calculated based on the latency and/or bandwidth capacity of each link of a potential route path. As another example, a score may be calculated to reflect the difference between two route paths such as how many nodes they have in common. In various embodiments, a scoring metric is utilized to determine the preferred route path and/or the probability a preferred route path is selected over other route paths or other preferred route paths.

At 409, path information is distributed. For example, a unique path identifier of a preferred route path, such as a single route path label, and next hop information is distributed to each hop along a preferred route path. In some embodiments, the path information includes a path label and next hop information and is utilized by each hop of the route path to determine the appropriate egress interface when a packet with the unique path identifier is received. In various embodiments, path information includes a version number that is used to expire route paths. For example, in the event a new preferred route path is determined at 407 to replace an existing preferred route path, path information is distributed that includes a version number that replaces the existing preferred route path with a new preferred route path. In some embodiments, the path information includes a specification of at least a portion of the route path that corresponds to the unique path identifier such as at least the next hop along the route path from the receiving router.

In some embodiments, path information associated with a new preferred route path is distributed and only once the entire path information is distributed to nodes of the entire route path can a previous version of the route path be expired. In some embodiments, route path information is distributed starting at the destination node (or the hop prior to the destination node) toward the source node in the reverse direction of the route path. In various embodiments, complete route path information must be distributed before a new preferred route path may be activated and used at the source node. In various embodiments, the new path information must be distributed completely in the event of a route update failure. An example of a route update failure includes a path controller, such as the central controller, crashing while in the middle of updating path information. By incorporating path version information in the path information and waiting for distribution of the path information to complete, incomplete route paths will not be activated and used.

Figure 5:
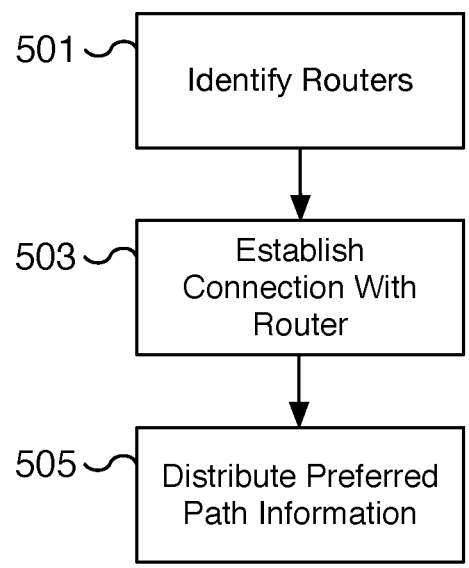
FIG. 5 is a flow diagram illustrating an embodiment of a process for distributing single label stack information for a software defined network.

FIG. 5 is a flow diagram illustrating an embodiment of a process for distributing single label stack information for a software defined network. In various embodiments, the process is performed by a central controller such as central controller 101 of FIG. 1 for each preferred route path. For example, a central controller distributes single label route path information to nodes of a single label stack software defined network for determining the route path for transmitting data between source and destination nodes. In some embodiments, the process of FIG. 5 may be repeated to distribute information for more than one or all preferred route paths of the network. In some embodiments, information for more than one route path is distributed concurrently. In various embodiments, the process of FIG. 5 is performed on a network topology such as the single label stack software defined network of FIG. 1 where the different nodes of the network are data centers with associated computer network routers. In some embodiments, the process of FIG. 5 is performed by computer system 200 of FIG. 2. In some embodiments, the process of FIG. 5 is performed at 307 of FIG. 3 and/or at 409 of FIG. 4. In some embodiments, the process of FIG. 5 is used to propagate route path information throughout the network and is performed at regular intervals and/or frequently to adjust the path data takes in the network in response to changing network conditions. In some embodiments, the process of FIG. 5 may be used to distribute route information in the event a node or link is added to or removed from the network.

At 501, one or more routers associated with one or more preferred route paths are identified. For example, in some embodiments, each hop of a route path is identified. In some embodiments, the source node and each intermediary hop of the route path is identified. In some embodiments, the destination node is identified as well. In the event the information for more than one route path is being distributed, the associated routers for each route path are identified. For example, each router is identified as requiring updated route information along with route path information and unique path identifiers for the route paths such as a unique route labels.

At 503, a connection is established with each identified router. For example, a connection is established with each router identified at 501 as requiring updated path information. In some embodiments, the connections are performed one at a time, in parallel, or in batches in parallel. For example, in some embodiments, one or more simultaneous connections to different routers are established and new connections are established after an existing one is closed. In some embodiments, the connection is a TCP/IP or UDP connection. In various embodiments, the connection is a remote procedure call connection. In some embodiments, the order of the connections is based on the reverse order of the route path.

At 505, preferred path information is distributed. For example, route path information such as next hop information and the associated unique path identifier is transmitted to each router identified at 501 via a connection established at 503. In some embodiments, the path information for a particular router is updated for all route paths associated with the router at once. In some embodiments, the path information for each route is updated in a sequence so that complete route information for a preferred route path is distributed in reverse route order. In various embodiments, the routers are computer network routers associated with data center nodes. In some embodiments, the preferred path information is distributed using a remote procedure call or other appropriate remote access technique. In various embodiments, the path information includes a specification of at least a portion of the route path associated with a unique path identifier such as a path label.

In some embodiments, the preferred path information includes version information. Using the version information, existing preferred route paths can be expired and replaced with new preferred route paths. The new preferred route paths may be optimized to route around congestion, network failures, bandwidth limitations, etc. In various embodiments, the updated path information is distributed at regular intervals such as every 15 seconds. In some embodiments, each router responds with a confirmation that the path information is received and accepted. In some embodiments, the confirmation includes confirmation that an appropriate egress interface corresponding to the next hop associated with the unique path identifier (such as a path label) from the particular router has been identified. In some embodiments, the path information is configured on each router of the path but only activated once the complete route has been configured.

Figure 6:
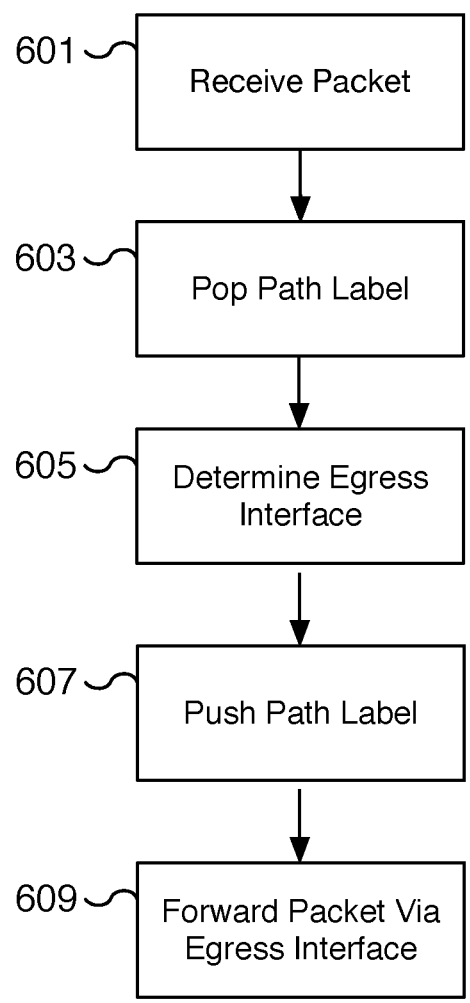
FIG. 6 is a flow diagram illustrating an embodiment of a process for routing traffic using a single label stack software defined network.

FIG. 6 is a flow diagram illustrating an embodiment of a process for routing traffic using a single label stack software defined network. In various embodiments, the process is performed by forwarding hardware, such as computer network routers, associated with data centers 111, 113, 115, 117, 119, 121, and/or 123 of FIG. 1 along a preferred route path. For example, a central controller distributes single label route path information to nodes of a software defined network for determining the route path for transmitting data between source and destination nodes. Using the received path information, the nodes apply the process of FIG. 6 to forward data between a source and destination node. In some embodiments, the process of FIG. 6 is only performed by the intermediary nodes of the route path. In various embodiments, the process of FIG. 6 is performed on a network topology such as the single label stack software defined network of FIG. 1 where the different nodes of the network are data centers and include routers and/or forwarding equipment. In some embodiments, the process of FIG. 6 is performed by computer system 200 of FIG. 2. In some embodiments, the process of FIG. 6 is performed using preferred path information distributed using the processes of FIGS. 3, 4, and/or 5. For example, the received preferred path information is used to associate path identifiers, such as a single path label, with a next hop and an egress interface. In various embodiments, the process of FIG. 6 may be used to perform traffic routing using a number of hops that exceeds the hop limit of underlying forwarding hardware.

At 601, a packet is received. For example a data packet is received at an ingress interface. In various embodiments, the packet includes a single label for determining the egress interface and/or next hop. For example, a data packet associated with a web application is received by an intermediate hop along the route path from the source data center to a destination data center. In some embodiments, the data packet is received by network forwarding equipment such as a router that supports label switching. For example, the router may be a Multiprotocol Label Switching (MPLS) router. In various embodiments, the data packet may include header information, such as IP headers, that are not utilized or inspected by the process of FIG. 6 in addition to a single path label.

At 603, the path label is popped from the label stack. For example, the path label associated with the data packet received at 601 is popped from the label stack. In various embodiments, the label stack includes only a single label and thus never exceeds the maximum label (and maximum hop) limit of the networking hardware. In various embodiments, the label is popped from the label stack without inspecting additional header information, such as IP headers, and/or data of the packet. In some embodiments, the step of 603 is an optional step for the source node of the route path. For example, the source route node may not perform the step of popping the path label stack from the label stack since the source node is the initial node that first determines the unique path label for the route path. In various embodiments, the step of 603 is performed by each of the intermediary hops along the route path. In some embodiments, the step of 603 is performed by the source node of the route path, for example, to simplify the implementation of the single label routing/switching process.

At 605, an egress interface is determined. Using the path label, such as the path label popped from the label stack at 603, an egress interface associated with the next hop along the route path is determined. In various embodiments, the path label is a unique path identifier and defines a preferred route path, including the intermediary hops, from a source node to destination node. In some embodiments, the egress interface is determined by inspecting a forwarding table using the path label as an index to determine the egress interface. For example, a forwarding table is populated using preferred path information distributed by a central controller, such as central controller 101 of FIG. 1. The table includes an index based on the path label and a value that corresponds to the egress interface for the next hop.

At 607, the path label is pushed onto the label stack. For example, a unique path label corresponding to the preferred route path is pushed onto the label stack. In various embodiments, the path label pushed is the same as the label popped at 603. For each hop along the route path, the single label that is pushed onto the label stack remains constant and is a unique path identifier for the preferred route path. Once the path label is pushed on the label stack, the label stack contains only a single path label. In some embodiments, the step of 607 is an optional step that is not performed by the hop prior to the destination node. For example, in some embodiments, the path label is used by the next hop to forward the received packet and since the destination node does not need to forward the packet, no path label is necessary and one is not pushed onto the label stack.

At 609, the packet is forwarded to the next hop via the egress interface. The data packet received at 601 is forwarded to the next hop using the egress interface determined at 605. In various embodiments, the forwarded data packet has a single label on its label stack that corresponds to the route path and is used by the next hop to forward the packet (if necessary).

Figure 7:
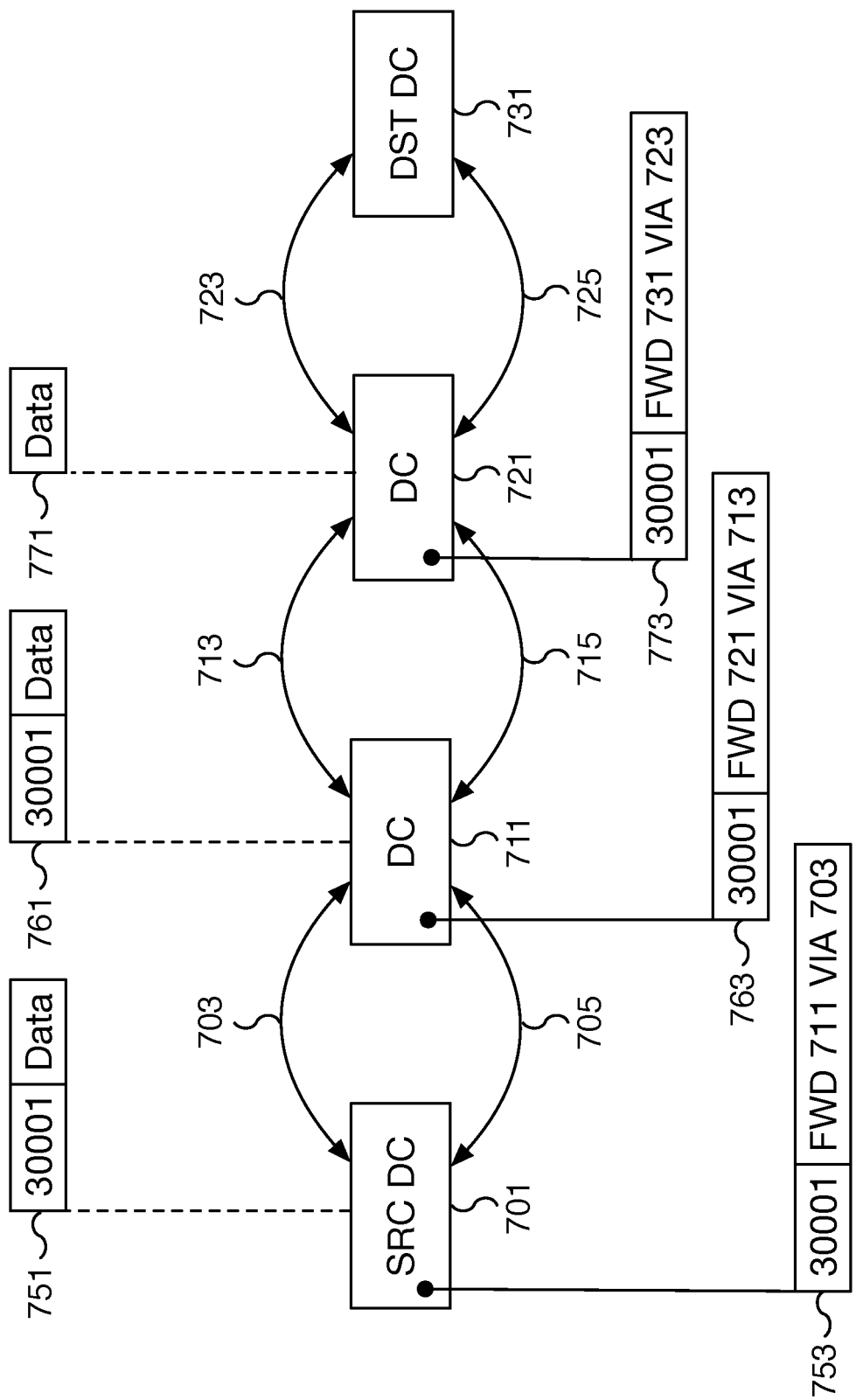
FIG. 7 is a diagram illustrating an exemplary application of a preferred route path for a single label stack software defined network.

FIG. 7 is a diagram illustrating an exemplary application of a preferred route path for a single label stack software defined network. In the example shown, potential routes and a preferred route path are depicted along with a path identifier associated with a data packet and path information stored at nodes along the route path. The exemplary application of a preferred route path shown in FIG. 7 includes source data center 701, intermediary data centers 711 and 721, and destination data center 731. Network connections 703, 705, 713, 715, 723, and 725 are network connections between data centers that may be used to transfer data packets. Source data center 701 is connected to intermediary data center 711 via network connections 703 and 705; intermediary data center 711 is connected to intermediary data center 721 via network connections 713 and 715; and intermediary data center 721 is connected to destination data center 731 via network connections 723 and 725. In the example shown, two alternative network connections connect each data center. The preferred route path utilizes network connections 703, 713, and 723. Path information for the preferred route path is stored at source data center 701 and intermediary data centers 711 and 721. Source data center 701 includes preferred route path information 753, intermediary data center 711 includes preferred route path information 763, and intermediary data center 721 includes preferred route path information 773. The data packet including any path labels prior to forwarding is shown. Source data center 701 forwards packet 751 to intermediary data center 711, intermediary data center 711 forwards packet 761 to intermediary data center 721, and intermediary data center 721 forwards packet 771 to destination data center 731. Both packets 751 and 761 include the data to be transmitted and a label stack with a single path label (e.g., "30001"). Packet 711 includes only the data as part of the packet and does not have any path labels. In various embodiments, the data portion of the packet may include additional headers, such as IP headers, not utilized by the single label stack software defined network for forwarding the packets from source data center 701 to destination data center 731. In various embodiments, source data center 701, intermediary data centers 711 and/or 721, and/or destination data center 731 include network forwarding equipment, such as routers, for popping, pushing, and inspecting path labels. In some embodiments, the preferred path information 753, 763, and 773 stored at each data center includes the egress interface (not shown) associated with the appropriate network connection.

In various embodiments, the application of a preferred route path is performed by forwarding hardware associated with data centers 111, 113, 115, 117, 119, 121, and/or 123 of FIG. 1 as a data packet is forwarded along a preferred route path from a source node to a destination node. In various embodiments, the path information is distributed to the nodes via a central controller such as central controller 101 of FIG. 1 using the processes of FIGS. 3, 4, and/or 5. In some embodiments, the path information is used to generate preferred route path information 753, 763, and/or 773. In some embodiments, the source and intermediate nodes utilize the process of FIG. 6 to forward the data packet from the source to the destination data center. In some embodiments, source data center 701, intermediary data centers 711 and/or 721, and/or destination data center 731 are data centers 111, 113, 115, 117, 119, 121, and/or 123 of FIG. 1 and network connections 703, 705, 713, 715, 723, and/or 725 are network connections between the data centers of FIG. 1.

In some embodiments, source data center 701 prepares packet 751 using a single label with value "30001." For example, preferred path label "30001" is pushed onto the label stack of packet 751. Source data center 701 utilizes the preferred path label (e.g., "30001") and corresponding preferred route path information 753 (e.g., label "30001" and forwarding information "FWD 711 VIA 703") to determine which link to utilize to forward packet 751 to the next hop. Preferred route path information 753 (having forwarding information "FWD 711 VIA 703") specifies that the next hop associated with the preferred path label with value 30001 is data center 711 via network connection 703. Using the path information available at source data center 701, packet 751 is forwarded to intermediary data center 711 via network connection 703. In various embodiments, the egress interface associated with network connection 703 is used to forward packet 751.

Once packet 751 is received at intermediary data center 711, the path label (e.g., "30001") is popped off the label stack and used to determine the next hop. Corresponding preferred route path information 763 (e.g., label "30001" and forwarding information "FWD 721 VIA 713") associated with intermediary data center 711 is referenced based on the popped label with value "30001" to determine which link to utilize to forward the data of packet 751 to the next hop. Preferred route path information 763 (having forwarding information "FWD 721 VIA 713") specifies that the next hop associated with the preferred path label with value 30001 is data center 721 via network connection 713. The preferred path label "30001" is pushed onto the label stack and the packet to be transmitted is now depicted as packet 761, which includes the data to be transmitted and a label stack with a single path label (e.g., "30001"). Using the path information available at intermediary data center 711, data packet 761 is forwarded to intermediary data center 721 via network connection 713.

Once packet 761 is received at intermediary data center 721, the path label (e.g., "30001") is popped off the label stack and used to determine the next hop. Corresponding preferred route path information 773 (e.g., label "30001" and forwarding information "FWD 731 VIA 723") associated with intermediary data center 721 is referenced based on the popped label with value "30001" to determine which link to utilize to forward the data of packet 761 to the next hop. Preferred route path information 773 (having forwarding information "FWD 731 VIA 723") specifies that the next hop associated with the preferred path label with value 30001 is data center 731 via network connection 723. Since the next hop is also the final destination of the packet, no preferred path label (e.g., "30001") is necessary and none is pushed onto the label stack. The packet to be transmitted is now depicted as packet 771, which includes only the data to be transmitted. Using the path information available at intermediary data center 721, data packet 771 is forwarded to destination data center 731 via network connection 723. In various embodiments, destination data center 731 receives packet 771 via network connection 723.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a specification of network paths between a group of computer network routers;
determining possible route paths between routers of the group of computer network routers and assigning a unique identifier to each route path of the possible route paths, wherein the unique identifiers of the possible route paths include a first unique identifier and a second unique identifier;
determining a first preferred route path of network traffic between a source computer network router and a destination computer network router among the group of computer network routers;
identifying the first unique identifier assigned to the first preferred route path;
providing using a first version identifier, at least to one or more computer network routers of the group of computer network routers in the first preferred route path a specification of the identified first unique identifier assigned to the first preferred route path for the source computer network router and the destination computer network router and a specification of at least a portion of the first preferred route path that corresponds to the identified first unique identifier; and
in response to a determination that a second preferred route path of network traffic between the source computer network router and the destination computer network router different from the first preferred route path has been identified, providing using a second version identifier, at least to one or more computer network routers of the group of computer network routers in the second preferred route path a specification of the second unique identifier assigned to the second preferred route path for the source computer network router and the destination computer network router and a specification of at least a portion of the second preferred route path that corresponds to the second identified unique identifier, wherein the first preferred route path associated with the first version identifier is to be expired based at least in part on the second version identifier and the second preferred route path is activated after all of the one or more computer network routers in the second route preferred path have received and confirmed the specifications provided using the second version identifier.

2. The method of claim 1, wherein each of the computer network routers of the group of computer network routers implement Multiprotocol Label Switching (MPLS).

3. The method of claim 2, wherein each of the computer network routers of the group of computer network routers is limited to support a specified maximum number of path labels for a packet.

4. The method of claim 1, wherein the first preferred route path of network traffic is determined based at least in part on monitoring a network status of the group of computer network routers.

5. The method of claim 4, wherein monitoring the network status of the group of computer network routers includes identifying congested paths between the group of computer network routers.

6. The method of claim 4, wherein monitoring the network status of the group of computer network routers includes calculating a congestion measurement for one or more of the network paths between the group of computer network routers.

7. The method of claim 1, wherein the specification of the network paths identifies a unique address associated with each computer network router of the group of computer network routers and specifies for each network path of the network paths a compatible network protocol and a resource capacity.

8. The method of claim 1, wherein the specification of the identified first unique identifier and the specification of at least the portion of the first preferred route path that corresponds to the identified first unique identifier are transmitted using a remote procedure call.

9. The method of claim 1, wherein the identified first unique identifier encodes path information associated with the first preferred route path.

10. The method of claim 9, wherein the path information encodes a first router identifier associated with the source computer network router and a second router identifier associated with the destination computer network router.

11. The method of claim 10, wherein the path information encodes a traffic class or a label switched path information.

12. The method of claim 1, wherein the identified first unique identifier includes a version number associated with the first preferred route path.

13. The method of claim 12, wherein the version number is encoded in two bits of the identified first unique identifier.

14. The method of claim 1, wherein the identified first unique identifier is a Multiprotocol Label Switching (MPLS) label.

15. The method of claim 1, wherein the identified first unique identifier includes a path label encoded in 20 bits.

16. The method of claim 1, wherein the group of computer network routers corresponds to computer network routers of geographically dispersed data centers.

17. A system comprising:
a processor; and
a memory coupled with the processor, wherein the memory is configured to provide the processor with instructions which when executed cause the processor to:
receive a specification of network paths between a group of computer network routers;
determine possible route paths between routers of the group of computer network routers and assigning a unique identifier to each route path of the possible route paths, wherein the unique identifiers of the possible route paths include a first unique identifier and a second unique identifier;
determine a first preferred route path of network traffic between a source computer network router and a destination computer network router among the group of computer network routers;
identify the first unique identifier assigned to the first preferred route path;
provide using a first version identifier, at least to one or more computer network routers of the group of computer network routers in the first preferred route path a specification of the identified first unique identifier assigned to the first preferred route path for the source computer network router and the destination computer network router and a specification of at least a portion of the first preferred route path that corresponds to the identified first unique identifier; and
in response to a determination that a second preferred route path of network traffic between the source computer network router and the destination computer network router different from the first preferred route path has been identified, provide using a second version identifier, at least to one or more computer network routers of the group of computer network routers in the second preferred route path a specification of the second unique identifier assigned to the second preferred route path for the source computer network router and the destination computer network router and a specification of at least a portion of the second preferred route path that corresponds to the second identified unique identifier, wherein the first preferred route path associated with the first version identifier is to be expired based at least in part on the second version identifier and the second preferred route path is activated after all of the one or more computer network routers in the second route preferred path have received and confirmed the specifications provided using the second version identifier.

18. The system of claim 17, wherein the first preferred route path of network traffic is determined based at least in part on identifying congested paths between the group of computer network routers.

19. The system of claim 17, wherein the first preferred route path of network traffic is determined based at least in part on calculating a congestion measurement for one or more of the network paths between the group of computer network routers.

20. A computer program product, the computer program product being embodied in a non-transitory computer readable storage medium and comprising computer instructions for:
receiving a specification of network paths between a group of computer network routers;
determining possible route paths between routers of the group of computer network routers and assigning a unique identifier to each route path of the possible route paths, wherein the unique identifiers of the possible route paths include a first unique identifier and a second unique identifier;
determining a first preferred route path of network traffic between a source computer network router and a destination computer network router among the group of computer network routers;
identifying the first unique identifier assigned to the first preferred route path;
providing using a first version identifier, at least to one or more computer network routers of the group of computer network routers in the first preferred route path a specification of the identified first unique identifier assigned to the first preferred route path for the source computer network router and the destination computer network router and a specification of at least a portion of the first preferred route path that corresponds to the identified first unique identifier; and
in response to a determination that a second preferred route path of network traffic between the source computer network router and the destination computer network router different from the first preferred route path has been identified, providing using a second version identifier, at least to one or more computer network routers of the group of computer network routers in the second preferred route path a specification of the second unique identifier assigned to the second preferred route path for the source computer network router and the destination computer network router and a specification of at least a portion of the second preferred route path that corresponds to the second identified unique identifier, wherein the first preferred route path associated with the first version identifier is to be expired based at least in part on the second version identifier and the second preferred route path is activated after all of the one or more computer network routers in the second route preferred path have received and confirmed the specifications provided using the second version identifier.

* * * * *